United States Patent
Victor et al.

(10) Patent No.: US 6,216,357 B1
(45) Date of Patent: Apr. 17, 2001

(54) WHEELS-ON BRAKE DRUM GAGE

(75) Inventors: Richard Victor, Mendon, MA (US); Stephen Offiler, North Scituate, RI (US)

(73) Assignee: Central Tools, INC, Cranston, RI (US)

( * ) Notice: Subject to any disclaimer, the term of this patent is extended or adjusted under 35 U.S.C. 154(b) by 0 days.

(21) Appl. No.: 09/252,370

(22) Filed: Feb. 18, 1999

(51) Int. Cl.$^7$ ............................... G01B 5/00; G01B 5/14
(52) U.S. Cl. ........................... 33/810; 33/811; 33/610
(58) Field of Search .................... 33/810, 811, 600, 33/609, 610, 542, 203, 783, 784, 792, 794, 796

(56) References Cited

U.S. PATENT DOCUMENTS

| | | | |
|---|---|---|---|
| 2,467,263 | * | 4/1949 | Krisanda ........................... 33/810 |
| 2,791,032 | * | 5/1957 | Barrett ............................. 33/610 |
| 3,190,006 | * | 6/1965 | Madeira ........................... 33/610 |
| 3,315,369 | * | 4/1967 | Johnson ........................... 33/810 |
| 4,416,063 | * | 11/1983 | Nestor et al. ..................... 33/810 |
| 4,782,595 | * | 11/1988 | Diewert ........................... 33/610 |
| 5,022,162 | * | 6/1991 | Luikko ............................. 33/810 |
| 5,044,090 | * | 9/1991 | Hunter ............................. 33/203 |
| 5,084,982 | * | 2/1992 | Feng ............................... 33/810 |
| 5,175,941 | * | 1/1993 | Ziegler et al. .................... 33/810 |
| 5,287,631 | * | 2/1994 | Stade .............................. 33/810 |
| 5,317,814 | * | 6/1994 | Rogler ............................ 33/810 |
| 5,398,419 | * | 3/1995 | Schmidt, Jr. et al. ............ 33/203 |
| 5,412,878 | * | 5/1995 | Edman ............................ 33/810 |
| 5,465,501 | * | 11/1995 | Rogler ............................ 33/810 |
| 5,490,335 | * | 2/1996 | Chu ................................ 33/810 |

FOREIGN PATENT DOCUMENTS

| | | | |
|---|---|---|---|
| 0510597 | * | 3/1955 | (CA) ............................. 33/810 |
| 1107136 | * | 12/1955 | (FR) ............................. 33/810 |
| 2663732 | * | 12/1991 | (FR) ............................. 33/810 |
| 2255182 | * | 10/1992 | (GB) ............................. 33/810 |
| 404318401 | * | 11/1992 | (JP) .............................. 33/810 |
| 406288701 | * | 10/1994 | (JP) .............................. 33/810 |

\* cited by examiner

*Primary Examiner*—Diego Gutierrez
*Assistant Examiner*—Yaritza Guadalupe
(74) *Attorney, Agent, or Firm*—Lackenbach Siegel Marzullo Aronson & Greenspan

(57) ABSTRACT

A brake drum gage is described for measuring the inside diameter of a brake drum of a vehicle with the wheel mounted on the vehicle in the presence of an axle tube and other undercarriage components or parts. The brake drum gage includes an elongate generally flat bar having proximate and remote ends and defines an elongate axis in a reference plane. A fixed element is fixedly mounted at the proximate end of the bar and a movable element is movably mounted on the bar for movements along the bar between the proximate and remote ends for adjusting the spacing between these elements. Each element includes a generally V-shaped arm that includes an upright portion generally parallel to the reference plane and an angled portion inclined in relation to an associated upright portion. A fixed anvil is provided on the angled portion of the fixed element and has a tip extending beyond the fixed element in a direction of the remote end of the bar and the movable anvil is provided on the angled portion of the movable element and has a tip extending beyond the movable element in a direction of the proximate end of the bar. An indicator in the form of an electronic digital module is provided for providing an indication of the distance between the tips of the anvils along the direction substantially parallel to the axis. The anvils on the angled portions are positionable at diametrically opposite positions of the inside cylindrical surface of the brake drum while the bar is spaced inwardly from the drum and clear of the axle tube and other undercarriage components or parts of the vehicle. Adjustable depth stops are provided on the angled portions of both elements to ensure accurate positioning of the anvils at diametrically opposite points of the cylindrical surface to be measured. In this manner the brake drum gage can be used to accurately measure brake drums without removing the wheels from a vehicle.

20 Claims, 3 Drawing Sheets

WHEELS-ON BRAKE DRUM GAGE

BACKGROUND OF THE INVENTION

1. Field of the Invention

This invention generally relates to measurement instruments, and more specifically to an adjustable gage for measuring the inside diameter of a brake drum of a vehicle while a wheel is mounted on the vehicle.

2. Description of the Prior Art

Brake drums on motor vehicles have an internal cylindrical surface arranged to be engaged by brake shoes or pads during braking. Because braking action relies on friction the brake shoes or pads as well as the cylindrical surface of the brake drums slowly wear with use and need to be adjusted or replaced in order to provide the necessary tolerances to provide reliable braking action. However, while the condition of the brake shoes or pads can frequently be established by visual inspection, it is more difficult to establish whether the brake drums fall within required specifications without utilizing a measuring instrument, such as a brake drum gage. One such brake drum gage is disclosed in U.S. Pat. No. 5,465,501 assigned to the assignee of the present application.

The problem addressed by the aforementioned U.S. Pat. No. 5,464,501 is the need to avoid inaccurate measurements resulting from improper positioning of the brake drum gage within the brake drum. The disclosed gage is provided with a plurality of pairs of adjustable depth stops that are movable along the jaws or arms of the gage which support the pointed anvils that contact the internal or external cylindrical surface to be measured. By adjusting selected depth stops to either retracted or extended positions, one pair of depth stops can be arranged to engage a rim or abutment surface of a cylindrical member, such as a brake drum, thereby ensuring that the measurement anvils will contact diametrically opposite sides of the cylindrical surface to be measured along a plane which is substantially normal to the axis of the cylindrical surface. This avoids oblique misalignments of the gage and ensures more precise measurements. However, the brake drum with adjustable depth stops disclosed in this patents is essentially a two-dimensional brake drum gage in which the jaws or arms are planar members essentially arranged in a common plane of the bar on which they are mounted. While the gage is suitable for providing very accurate measurements of a drum when the wheel is removed from the vehicle, and there are no encumbrances in the way for making the measurements on the brake drum, a gage that is two dimensional is not practical for making brake drum measurements while the wheel is mounted on the vehicle due to the presence of undercarriage and other components or parts that block free access to the cylindrical surface of the brake drum. The major obstacle or encumbrance that typically prevents such access is the wheel axle and axle tube which generally has a large diameter and extends transversely across the vehicle between opposing wheels. It is difficult, in the presence of such an axle tube, as well as other undercarriage components or parts, to position a two dimensional brake drum gage which properly aligns the measuring anvils at diametrically opposite points of the brake drum cylindrical surface, as discussed in the aforementioned patent, and the same time orients the brake drum gage in a position that makes it possible for the mechanic to read the dimensional markings or indications on the gage.

SUMMARY OF THE INVENTION

Accordingly, it is an object of the present invention to provide an adjustable drum gage which does not have the disadvantages inherent in prior art drum measurement gages.

It is another object of the present invention to provide an adjustable gage for conveniently and accurately measuring the diameter of the cylindrical surface of a body such as a brake drum in the presence or absence of encumbrances in the region of the cylindrical surface such as an axle tube or other undercarriage components or parts in the proximity of a brake drum.

It is still another object of the present invention to provide an adjustable brake drum gage as aforementioned which is simple in construction and inexpensive to manufacture.

It is yet another object of the present invention to provide an adjustable gage as suggested in the previous objects which allows precise measurements to be obtained both by expert mechanics or technicians as well as those with lesser experience.

It is a further object of the present invention to provide a brake drum gage of the type under discussion which can be quickly and conveniently calibrated for zero spacing between the measurement anvils.

In order to achieve the above objects as well as others which will become apparent hereafter a brake drum gage in accordance with the present invention is used for measuring the inside diameter of a brake drum of a vehicle with the wheels mounted on the vehicle in the presence of an axle tube or other undercarriage components or parts. The brake drum gage comprises an elongate generally flat bar having proximate and remote ends and defining an elongate axis in a reference plane. A fixed element is fixedly mounted at said proximate end of said bar and a remote element is movably mounted on said bar for movements along said bar between said proximate and remote ends for adjusting the spacing between said elements. Each element includes a generally V-shaped arm including an upright portion generally parallel to said reference plane and an angled portion inclined in relation to an associated upright portion and said reference plane. A fixed anvil is provided on said angled portion of said fixed element and has a tip extending beyond said fixed element in a direction of said remote end of said bar and a movable anvil on said angled portion of said movable element and having a tip extending beyond said movable element in a direction of said proximate end of said bar. Indicating means is provided for providing an indication of the distance between said tips of said anvils along a direction substantially parallel to said axis, said anvils on said angled portions being positionable at diametrically opposite positions on the inside cylindrical surface of a brake drum while said bar is spaced inwardly from said drum and clears the axial tube and other undercarriage components or parts of the vehicle. In this manner the drum gage can be used to measure brake drums without removing the wheels from the vehicle.

BRIEF DESCRIPTION OF THE DRAWINGS

These and other objects, features and characteristics of the present invention will be more fully apparent, understood and appreciated from the ensuing detailed description, when read with reference to the various figures of the accompanying drawings, wherein.

DESCRIPTION OF THE PREFERRED EMBODIMENTS

Figure 1:
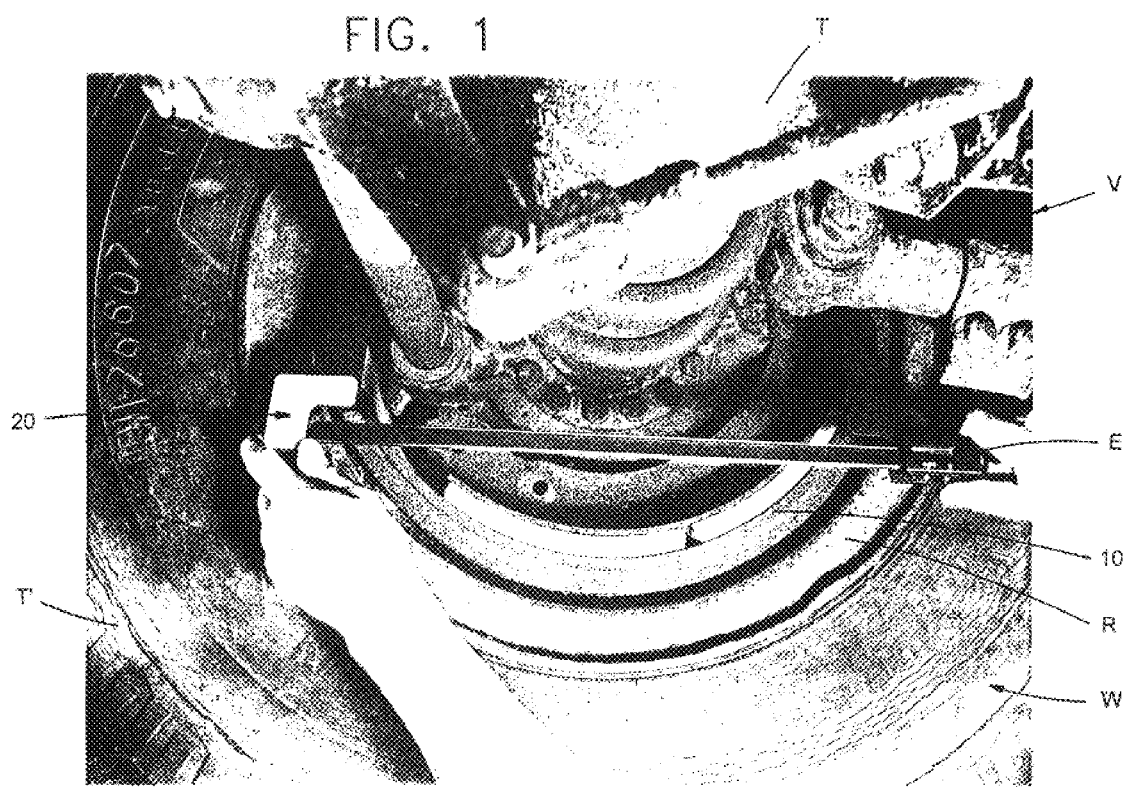
FIG. 1 is a view of the undercarriage of a vehicle showing the manner in which the brake drum gage in accordance with the present invention, with adjustable depth stops, may be used to accurately measure the inside diameter of the cylindrical surface of a brake drum with a wheel in pace and in the presence of an axle tube and other undercarriage components or parts.

Referring now specifically to the Figures in which identical or similar parts are designated by the same reference numerals throughout, the undercarriage U of a motor vehicle is shown in the proximity of a wheel W whose brake drum 10 is to be measured from time to time. The illustration is, specifically, for a wheel on a large truck or trailer. While the undercarriage U may differ from vehicle to vehicle, it should be clear that each wheel is mounted on an axle and an axle tube T as shown which extends between opposing wheels of the body of the truck or trailer. The tire T' is mounted on a rim R which is, in turn, secured to the brake drum 10.

FIG. 1 also illustrates the manner in which a brake drum gage 20 may be used and held by the hands H of a mechanic for measuring the inside diameter of the brake drum 10 of the vehicle with the wheel tire T' and rim R mounted on the vehicle in the presence of the axle tube T and other of the undercarriage U components or parts while still making the readings on an electronic module E readable. The construction of the brake drum gage 20 that makes such measurements possible will be more fully described in connection with FIGS. 2 and 3.

Figure 2:
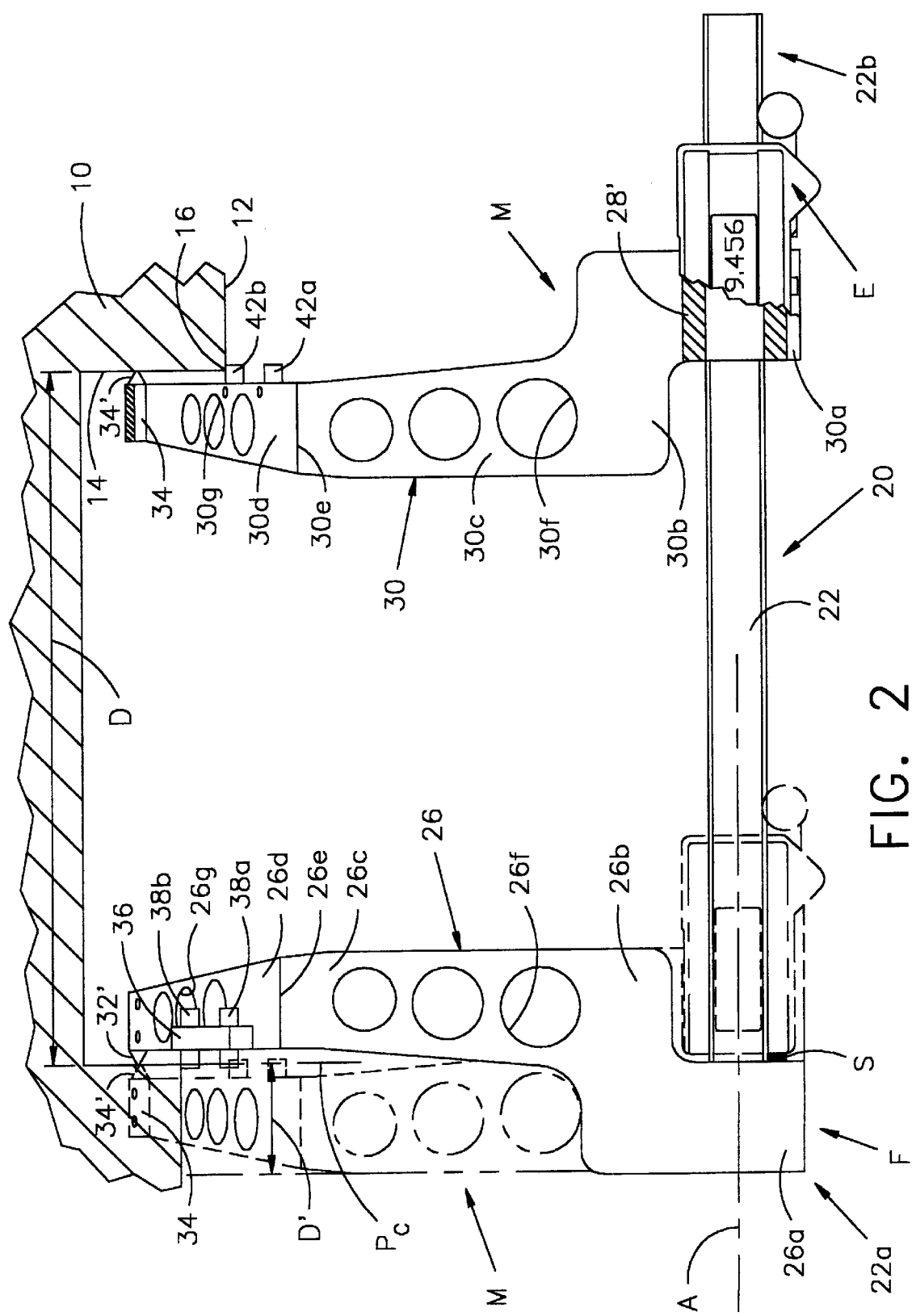
FIG. 2 is a side elevational view of the brake drum gage of the present invention, showing the fixed and movable arms or jaws of the gage in positions spaced from each other along the bar to measure the inside diameter of a cylindrical surface such as a brake drum in which adjustable depth stops are used for accurately aligning or positioning the anvils for obtaining accurate measurements and also showing, in phantom outline, the position of the movable or adjustable jaw or arm in a position suitable for calibrating the anvils for zero spacing or zero distance between the anvils.

Referring to FIG. 2, the brake drum 10 is illustrated diagrammatic as having an abutment surface 12 which is the innermost surface of the brake drum. The critical dimension of the brake drum 10 that must be periodically monitored and maintained within specifications is the diameter D of the internal cylindrical surface 14 against which the brake shoes or pads (not shown) frictionally abut against. An angular rim or edge 16 is formed where the abutment surface 12 meets the internal cylindrical surface 14.

The brake drum gage 20 includes an elongate generally flat bar 22 having a proximate end 22a (at the left end as viewed in FIG. 2) and a remote end 22b (at the end as viewed in FIG. 2). The flat bar 22 also defines a reference plane P, best shown in FIG. 3.

A fixed element F is fixedly mounted at the proximate end 22a of the bar 22 and a movable element M is movably mounted on the bar 22 for movement along the bar between the proximate and remote ends 22a, 22b for adjusting the spacing between the elements F, M.

Figure 3:
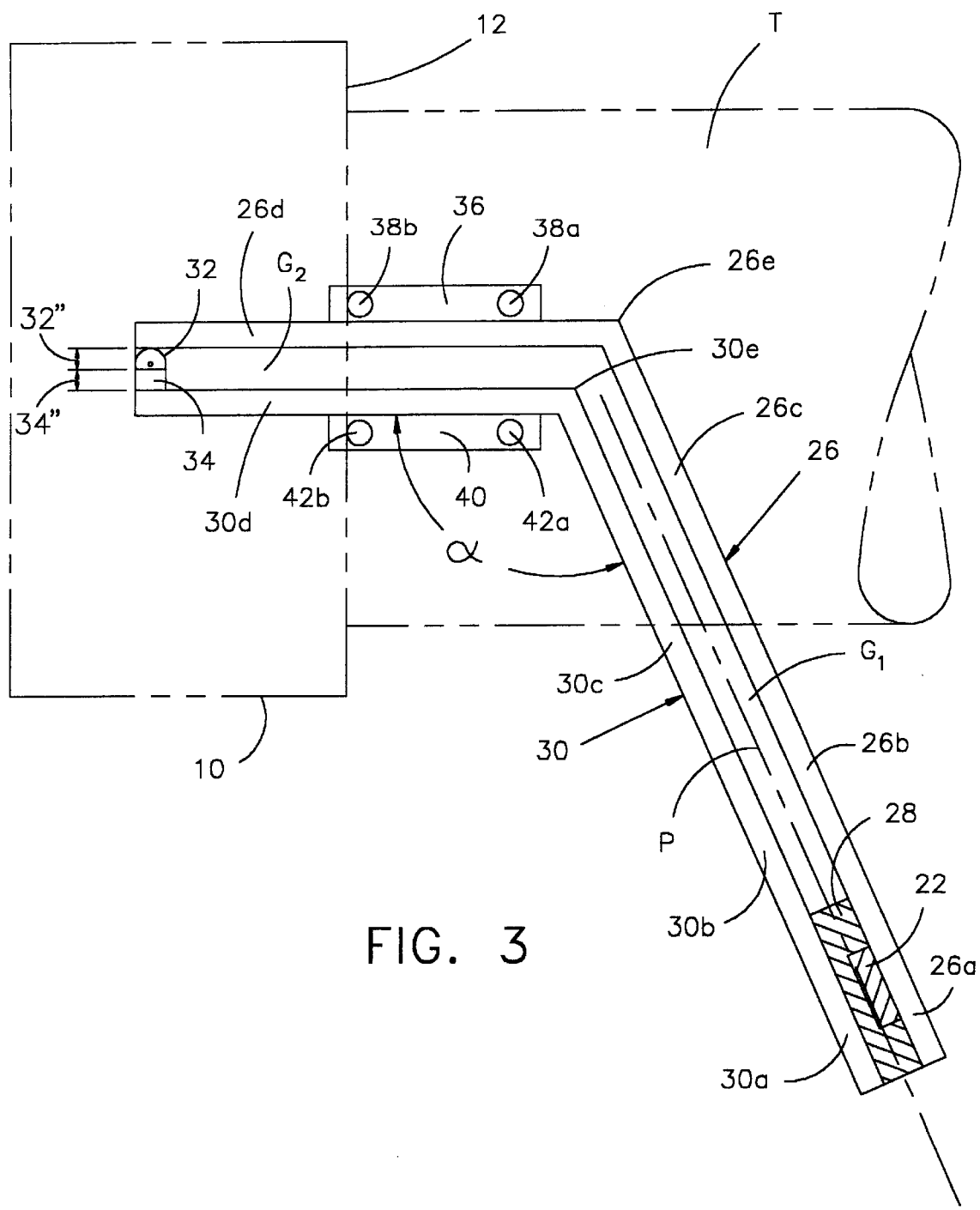
FIG. 3 is an end elevational view, partially in cross section, of the brake drum gage shown in FIGS. 1 and 2, better illustrating the relationship between the upright and angled portions of each of the arms or jaws of the gage that facilitates measurements of brake drums in the presence of axle tubes and other undercarriage components or parts.

An important feature of the present invention is that the fixed element F and the movable element M each includes a generally V-shaped arm which includes an upright portion generally parallel to the reference plane P and an angled or inclined portion which is inclined in relation to an associated upright portion and, therefore, also in relation to the plane P. Specifically, the fixed element F includes a fixed arm or jaw 26 fixedly secured in any conventional manner to the flat bar 22 by means of, for example, an attachment bracket 28 (FIG. 3). The fixed arm or jaw 26 includes a fixed transverse portion 26a which is secured to the proximate end 22a of the bar 22 by means of the attachment bracket 28. A fixed axial portion 26b extends from the transverse portion 26a in a direction of the remote end 22b for offsetting an upright portion 26c from the transverse portion 26a, as shown in FIG. 2, so that while the transverse portion 26a may be fixedly secured to the proximate end of the bar 22 the upright portion 26c is offset inwardly a predetermined axial distance from the remote end 22b. Also, as evident from FIGS. 2 and 3, the upright portion 26c extends to one transverse side of the bar 22, shown extending above the bar in FIG. 2. An angled portion 26d is likewise offset along the direction of the bar or axis A, for reasons to be discussed below. Similarly, the movable element M includes a movable arm or jaw 30 which has a movable transverse portion 30a which is movably or slidably mounted on the bar 22 in any known or conventional manner. A movable axial portion 30b extends from the movable transverse portion 30a in the direction of the proximate end 22a and to same transverse side of the bar 22, above the bar as viewed in FIG. 2.

It will be evident that the movable element M can slide along the longitudinal or axial direction of the bar 22 to variably adjust the distance or relative positions between the fixed arm or jaw 26 and the movable arm or jaw 30. FIG. 2 illustrates a leftmost position of the movable arm or jaw 30 in phantom outline. Advantageously suitable stop means is provided for stopping the movable transverse portion 30a at a predetermined position, as shown in FIG. 2, in which the fixed and movable arms or jaws 26, 30 can be appropriately calibrated to represent the "zero" position of the movable element M. The specific stop means used is not critical and in the embodiment illustrated such stop means may be in the form of an adjustable screw S which is threadedly mounted within a threaded whole formed in the attachment bracket 28 so that the screw may be turned inwardly or outwardly along a direction substantially parallel to the axis A and positioned to engage the movable transverse portion 30a or an attachment bracket 28' to which the transverse portion may be attached.

As best shown in FIG. 2 the fixed element F is provided at the extreme free end of the angled portion 26d with a fixed anvil 32 which has a tip 32' extending beyond the angled portion and having a point extending beyond the angled portion 26d in a direction of the proximate end of the bar 22. Similarly, the movable element 30 is provided with a movable anvil 34 at the extreme free end of the angled portion 30d which is provided with a tip 34' extending beyond the movable element M in a direction of the remote end 22b of the bar. The fixed and movable elements F, M and particularly the dimensions of the transverse portions 26b, 30b are selected to position the tips 32', 34' of the anvils 32, 34 along a "zero calibration plane" PC spaced a predetermined axial distance D' from the proximate end 22a of the bar. Once the stop or adjustment screw S has been set to position the movable anvil 34 to position its measuring tip 34' in alignment with the measuring tip 32' of the fixed anvil 32 the calibration of the gage for a zero setting is mechanical, simply requiring the movable element M to be moved towards the proximate end 22a until it comes into abutment with the stop screw S. This position of the movable element, therefore, defines the zero calibration position.

Referring to FIG. 3, the configurations and arrangements of the fixed and movable elements F, M are illustrated which make it possible to slide the movable element M along the entire bar 22, including the calibration position illustrated in phantom outline in FIG. 2, by arranging the upright portions 26c, 30c of the fixed and movable elements F, M, respectively, spaced from each other in planes substantially parallel to the reference plane P of the bar 22. By positioning each of the upright portions 26c, 30c to another side of the reference plane P the upright portions 26d, 30d are spaced from each other to provide a clearance or gap $G_1$. Similarly, the angled portions 26d, 30d are likewise spaced from each other in substantially parallel planes and inclined to the reference plane P by an angle a to form a clearance or gap $G_2$. By providing spaces, gaps or clearances between the associated fixed arm or jaw portions the movable portions 30c and 30d can be positioned coextensively or moved to both sides of the fixed portions 26c, 26d without contacting each other. The specific sizes of the gaps or clearances $G_1$, $G_2$ is not critical as long as the anvils 32, 34 do not abut or contact each other during movements of the movable element at the proximate end of the bar. Thus referring to FIG. 3, if the anvils 32, 34 are mounted on the facing surfaces of the angled portions 26d, 30d, respectively, the gap or space G2 must be equal to at least the sum of the transverse dimensions 32" and 34". By maintaining the spacing or the transverse size of the gap $C_2$ greater than the sum of the transverse dimensions of the measuring angles 32, 34 it will be clear that the fixed and movable elements can overlap or slide past each other or slide past each other relative to the bar 22.

Advantageously there is provided, on the upper or outer surface of the fixed angled portion 26d, a support block 36 on which there are mounted adjustable depth stops 38a, 38b that can be selectively and slidably moved along directions substantially parallel to the axis A between extended positions in which the depth stops project beyond the angled portion 26d in a direction towards the proximate end 22a (towards the left as viewed in FIG. 2) and retracted positions for which the depth stops are slidably moved towards the remote end 22b (towards the right as viewed in FIG. 2) to clear the edge of the angled portion 26d. Similarly a support block 40 is mounted on the lower surface of the movable angled portion 30d (as viewed in FIG. 3) which likewise supports adjustable depth stops 42a, 42b movable between extended positions in which the depth stops are moved towards the remote end 22b (towards the right as viewed in FIG. 2) and retracted positions in which depth stops are moved towards the proximate end 22a (towards the left as viewed in FIG. 2). Although only two adjustable depth stops are shown on each support block it will be clear that any design plurality of such depth stops may be used depending on the desired adjustability as well as based upon the physical dimensions of the angled portions 26d, 30d. Clearly the longer the angled portions are the more depth stops will be useful. The function or operation of the adjustable depth stops is the same as described in U.S. Pat. No. 5,465,501, which, to the extent of the discussion of the adjustable depth stops, is incorporated herein.

Also shown in FIG. 2 is a plurality of holes 26f, 30f provided in the fixed and movable upright portions 26c, 30c, respectively, and holes 26g, 30g in the fixed and movable inclined portions 26d, 30d. The holes provided in these portions are provided to primarily reduce the weight of the gage so that it may be more readily held or supported under difficult conditions such as under the carriage of a vehicle.

While the angle a shown in FIG. 3 is not critical per se it has been found that a useful range for alpha is 90°–135°. A preferred range for $\alpha$ is 100°–121°. In the embodiment illustrated the angle $\alpha$ of approximately 111° has been found to be very suitable for measuring the brake drums under large trucks or carriages which have relatively large axle tubes T and other undercarriage components or parts. Clearly the usefulness of the gage 20 is a function of the angle a but also the physical dimensions of the upright and inclined elements and the angled portions must be selected to be sufficiently large to allow the user to access the brake drums while avoiding obstructions under the carriage as shown in FIG. 1. One specific example for the dimensions of the fixed and movable elements includes a total height of the fixed upright portion 26c of approximately 6 inches, a total length of the angled portion 26d of approximately 3.9 inches. On the other hand the movable upright portion may be provided with a total length or height of approximately 5.7 inches while the length of the angled portion 30d is approximately 3.5 inches.

In use, the gage 20 is positioned as shown in FIG. 1, with the anvils 32', 34' agaginst the brake drum cylindrical surface to be measured. Depending on the depth of the desired measurement one corresponding pair of adjustable depth stops 38a, 38b and 42a, 42b are moved to extended positions to engage the abutment surface 12. Assuming the electronic module E has been calibrated, the diameter of the brake drum surface can be read directly from the module E.

Large cargo trucks and trailers, because of their size and the speed at which they travel, have potential for causing serious accidents. Accordingly, more and more states regulate the safety features of such vehicles and require minimum standards of maintenance. Weighing stations along the many truck routes are common. However, more and more states routinely require trucks to be inspected while they travel on state and interstate highways. Some states and Canada have been very diligent in checking the safety of such vehicles. Checking the brake drums has been an increasingly common safety check to make sure that these very large vehicles have operating brakes. However many of the trucks have numerous axles and consequently many drums that need to be checked. For example, trailers having as many as nine axles are not uncommon. A nine axle trailer includes 18 wheels and therefore 18 drums that need to be checked. To remove all of the wheels and check the drums using conventional procedures and tools, such as the two-dimensional drum gage disclosed in U.S. Pat. No. 5,465,501, would be much too time consuming and costly. However, although the labor costs are high, more and more Departments of Transportation require such checks. With the present invention the drums can be quickly and conveniently checked without removing the wheels and, for example, an eighteen wheeler can be readily checked within one hour. This represents a significant saving in time and money and facilitates the checking of such vehicles.

Not only does the gage 20 of the present invention enable inspection of brake drums without removing the wheels but such checks may be made by one individual in a rapid an efficient manner.

Although the present invention has been described in relation to particular embodiments thereof, many other variations, modifications and other uses will become apparent to those skilled in the art. It is the intention, therefore, that the present invention not be limited by the specific disclosure of the embodiments therein, but only by the scope of the appended claims.

What we claim is:

1. A brake drum gage for measuring an inside diameter of a brake drum of a vehicle with a wheel mounted on the vehicle in a presence of an axle tube and other undercarriage components or parts, comprising an elongate generally flat bar having proximate and remote ends and defining an elongate axis and reference plane; a fixed element fixedly mounted at said proximate end of said bar and a movable element movably mounted on said bar for movements along said bar between proximate and remote ends for adjusting a spacing between said elements, each element including a generally V-shaped arm including an upright portion generally parallel to said reference plane and an angled portion inclined an angle α in relation to said reference plane of said flat bar; a fixed anvil on said angled portion of said fixed element and having a tip extending beyond said fixed element in a direction of said proximate end of said bar and a movable anvil on said angled portion of said movable element and having a tip extending beyond said movable element in a direction of said remote end of said bar; indicating means for providing an indication of a distance between the tips of said anvils on said angled portions being positionable at diametrically opposition positions on an inside cylindrical surface of a brake drum while said bar is spaced inwardly from said drum and clears the axle tube and other undercarriage components or parts of the vehicle, whereby the drum gage can be used to measure brake drums without removing wheels from a vehicle.

2. A brake drum gage as defined in claim 1, wherein said upright portions of said fixed and movable elements are spaced from each other in substantially parallel planes and said angled portions of said fixed and movable elements are spaced from each other in substantially parallel planes, whereby said movable portions can be positioned coextensively with or moved to both sides of said fixed portions along said axis of said bar.

3. A brake drum gage as defined in claim 2, further comprising zeroing means for zeroing said indicating means when a spacing between said tips along said axis of said bar is set to zero.

4. A brake drum gage as defined in claim 3, wherein said zeroing means comprises stop means for physically stopping said movable element when moved in the direction of said proximate end at a point when the distance between said tips is reduced to zero.

5. A brake drum gage as defined in claim 2, wherein said fixed element comprises a fixed transverse portion secured to said proximate end of said bar and a fixed axial portion extending between said transverse portion and said upright portion of said fixed element for axiallly offsetting said upright portion in the direction of said remote end in relation to said fixed transverse portion for positioning said fixed anvil a predetermined axial distance from said remote end and to one transverse side of said bar, and said movable element comprises a movable transverse portion slidably mounted on said bar and a movable axial portion extending from said movable transverse portion in the direction of said proximate end and to said one end transverse side of said bar; stop means for stopping said movable transverse portion at a predetermined position in which said tip of said movable anvil is positioned at said predetermined axial distance along said bar to align said anvil tips along the direction of said axis, whereby movement of said movable portion towards said proximate end of said bar causes said tips to point towards each other to reflect a physical and true "zero" axial distance between said tips and said indicating means is calibrated to show a spacing of zero.

6. A brake drum gage as defined in claim 5, wherein said stop means comprises an adjustment screw threadedly mounted on said fixed element for movements in the direcction of said axis and for engagement with said movable element.

7. A brake drum gage as defined in claim 1, wherein α is selected from the range of 90°–135°.

8. A brake drum gage as defined in claim 7, wherein 100°<α<121°.

9. A brake drum gage as defined in claim 8, wherein α≈111°.

10. A brake drum gage as defined in claim 1, wherein said indicating means includes an electronic digital module.

11. A brake drum gage as defined in claim 1, wherein said fixed and movable elements are supported on opposite sides of said flat bar.

12. A brake drum gage as defined in claim 1, wherein said fixed upright portion is approximately 6 inches long and said fixed angled portion is approximately 4 inches long, and said movable upright portion is approximately 5.7 inches long and said movable angled portion is approximately 3.5 inches long.

13. A brake drum gage as defined in claim 1, wherein the lengths of said upright and angled portions are selected to maintain associated portions substantially parallel to each other when the same angles of inclination are used for said upright and angled portions of said fixed and movable elements.

14. A brake drum gage as defined in claim 1, wherein said movable and fixed elements are made of aluminum.

15. A brake drum gage as defined in claim 14, wherein apertures or openings are provided in said angled portions to reduce the weight of the gage.

16. A brake drum gage as defined in claim 15, wherein said apertures or openings are in the form of a series of openings successively arranged along a line extending along said angled portions.

17. A brake drum gage as defined in claim 1, further comprising depth stop means for selectively adjusting the extent to which said anvils on said angled portions can penetrate a cylindrical surface to be measured beyond a reference plane substantially normal to an axis of said cylindrical surface.

18. A brake drum gage as defined in claim 17, wherein said depth stop means comprises a plurality of adjustable depth stops at least some of which are slidably mounted on an angled portion to move between retracted positions in which said depth stops do not restrict or limit the positions of said anvils in relation to said reference surface and extended positions in which said depth stops engage an edge or abutment surface of a drum to limit the further penetration of an associated anvil into said brake drum beyond said reference plane.

19. A brake drum gage as defined in claim 18, wherein at least two adjustable depth stops are spaced from each other along each of said angled portions at different distances from an associated anvil.

20. A brake drum gage as defined in claim 19, wherein a support block is provided on each angled and portion provided with spaced bores having axes substantially parallel to said axis of said bar, said adjustable depth stops comprising cylindrical pins slidably mounted in said bores.

* * * * *